(12) United States Patent  
Beeman et al.

(10) Patent No.: US 7,448,163 B2  
(45) Date of Patent: Nov. 11, 2008

(54) FLOATABLE PLANT CULTIVATION SYSTEM

(76) Inventors: Stephen Edward Beeman, 309 South Indian River Rd., New Smyrna Beach, FL (US) 32169; Forest Mathew Beeman, 2007 Saxon Dr., New Smyrna Beach, FL (US) 32169

( * ) Notice: Subject to any disclaimer, the term of this patent is extended or adjusted under 35 U.S.C. 154(b) by 158 days.

(21) Appl. No.: 11/305,971

(22) Filed: Dec. 19, 2005

(65) Prior Publication Data

US 2007/0137100 A1    Jun. 21, 2007

(51) Int. Cl.  
*A01G 31/00* (2006.01)

(52) U.S. Cl. .................................. 47/65; 47/60; 47/66.3

(58) Field of Classification Search ................ 47/59 R, 47/64, 59 S, 60, 61, 62 R, 62 A, 62 N, 63, 47/65.5, 66.1, 66.3, 66.4, 66.5, 66.6, 39, 47/65.7, 65, 86, 31.1; 119/221, 222, 223, 119/239, 240, 253  
See application file for complete search history.

(56) References Cited

U.S. PATENT DOCUMENTS

| | | | |
|---|---|---|---|
| 2,531,562 A * | 11/1950 | Eve ................................ | 47/80 |
| D239,129 S * | 3/1976 | Rosenberger .............. | D11/143 |
| 4,034,506 A | 7/1977 | Kasahara et al. | |
| 4,037,360 A | 7/1977 | Farnsworth | |
| 4,058,931 A | 11/1977 | Vestergaard | |
| 4,312,152 A | 1/1982 | Drury et al. | |
| 4,487,588 A | 12/1984 | Lewis, III et al. | |
| 4,513,533 A | 4/1985 | Gething et al. | |
| 4,536,988 A | 8/1985 | Hogen | |
| 4,622,775 A | 11/1986 | Glenn et al. | |
| 5,261,185 A * | 11/1993 | Koide et al. ................... | 47/63 |
| 5,675,933 A | 10/1997 | Kawaguchi et al. | |
| 6,014,838 A | 1/2000 | Asher | |
| 6,062,170 A * | 5/2000 | Finch et al. ................ | 119/215 |
| 6,751,903 B2 | 6/2004 | Shryock | |
| 6,843,021 B1 * | 1/2005 | Huang .......................... | 47/63 |
| 2003/0070357 A1 | 4/2003 | Huang | |
| 2004/0020116 A1 | 2/2004 | Schuck | |
| 2004/0255513 A1 | 12/2004 | Becker | |
| 2005/0183331 A1 | 8/2005 | Kania et al. | |

* cited by examiner

*Primary Examiner*—T. Nguyen  
(74) *Attorney, Agent, or Firm*—Cian G. O'Brien, Esq.; Robert L. Wolter, Esq.; Beusse Wolter Sanks Mora & Maire, P.A.

(57) ABSTRACT

A floatable plant cultivation system that comprises a plurality of buoyant bases secured together and float on a water surface. One or more of the bases includes means for supporting one or more plants. The bases have side edges that abut one another and are secured together. In a preferred embodiment, the bases are rectangular mats fabricated from a closed-cell foam plastic material. Each of the bases has at least one side edge wherein a plurality of indentations are spaced apart along the side edge forming a plurality of protrusions and each indentation is positioned between consecutively spaced protrusions. The side edges of respective bases are joined together such that the protrusions on one base are positioned in mating relationship with the indentations of another base. In addition, or alternatively, the bases can be secured together by clips.

14 Claims, 6 Drawing Sheets

FLOATABLE PLANT CULTIVATION SYSTEM

BACKGROUND OF THE INVENTION

This invention pertains generally to growing aquatic plants such as shoreline emergent or littoral plants. More specifically, the invention relates to those systems or devices that float and support plants on water.

Lakes, ponds and other bodies of water often are contaminated with various contaminants such as fertilizers or plant and grass nutrients. Such contaminants may spawn algae blooms in the water, which can sap the body of water of oxygen needed by fish and other marine life. Emergent aquatic plants, also referred to as littoral shelf plants, are planted along shorelines of ponds, lakes or canals and other bodies of water in order to combat the contaminants in the water. Indeed, regulations have been adopted in many states that require planting the emergent aquatic plants along shorelines of bodies of water. These aquatic plants have root systems that are partially exposed under water. The photosynthesis process of the plants produces oxygen from the roots, which is needed by aquatic animal life. In addition, the plants consume the contaminant nutrients which helps prevent algae blooms. The plants can also provide a habitat for aquatic animals.

However, fluctuations in water levels can make these plants ineffective. When water levels drop, the roots of the plants may no longer be submerged in the water so the water does not receive the oxygen produced from the plants, and the plants cannot consume the contaminant nutrients in the water. Moreover, weeds or grass can overtake the plants creating an unsightly shoreline, and possibly killing the plants. When the water levels rise, the plants may eventually die at high water levels for extended periods of time.

Floating systems or devices have been used to support plants in the water off the shoreline to fight the results of nutrient contaminants. One such system successfully used a floating corral made of PVC piping. Hyacinths were placed within the corral to consume the nutrients in a lake; however, these plants grew extremely rapidly and overcame the corral. The growth of the hyacinths had to be closely monitored to harvest the plants to prevent the hyacinths from overtaking portions of the lake. By introducing such an aggressive non-native plant more problems may be created than solved.

Accordingly, a system, device or method is needed that can support aquatic plants in water off the shoreline of the body of water. Such a system would preferably support native aquatic emergent plants off or adjacent to the shoreline to consume contaminant nutrients and produce oxygen. However, the present invention is not limited to use with aquatic emergent plants, but could be used to support any type of plant for various purposes including, but not limited to, agricultural, commercial nurseries or research purposes.

BRIEF DESCRIPTION OF THE INVENTION

The present invention is for a floatable plant cultivation system that comprises a plurality of buoyant bases secured together and float on a water surface. One or more of the bases includes means for supporting one or more plants. The bases have side edges that abut one another and are secured together. In a preferred embodiment, the bases are rectangular mats fabricated from a closed-cell foam material. Each of the bases has at least one side edge wherein a plurality of indentations are spaced apart along the side edge forming a plurality of protrusions and each indentation is positioned between consecutively spaced protrusions. The side edges of respective bases are joined together such that the protrusions on one base are positioned in mating relationship with the indentations of another base. In addition, or alternatively, the bases can be secured together by clips.

In a preferred embodiment, the means for supporting the plants on the bases comprises one or more holes formed in the base. An aerated pot extends through the holes and below the surface of the water. The pot supports the plant on the base. As the pot has a plurality of openings the plant's root system grows into and is exposed below the surface of the water. The plant consumes the contaminant nutrients in the water, and produces oxygen.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings.

DETAILED DESCRIPTION OF THE DRAWINGS

Figure 1:
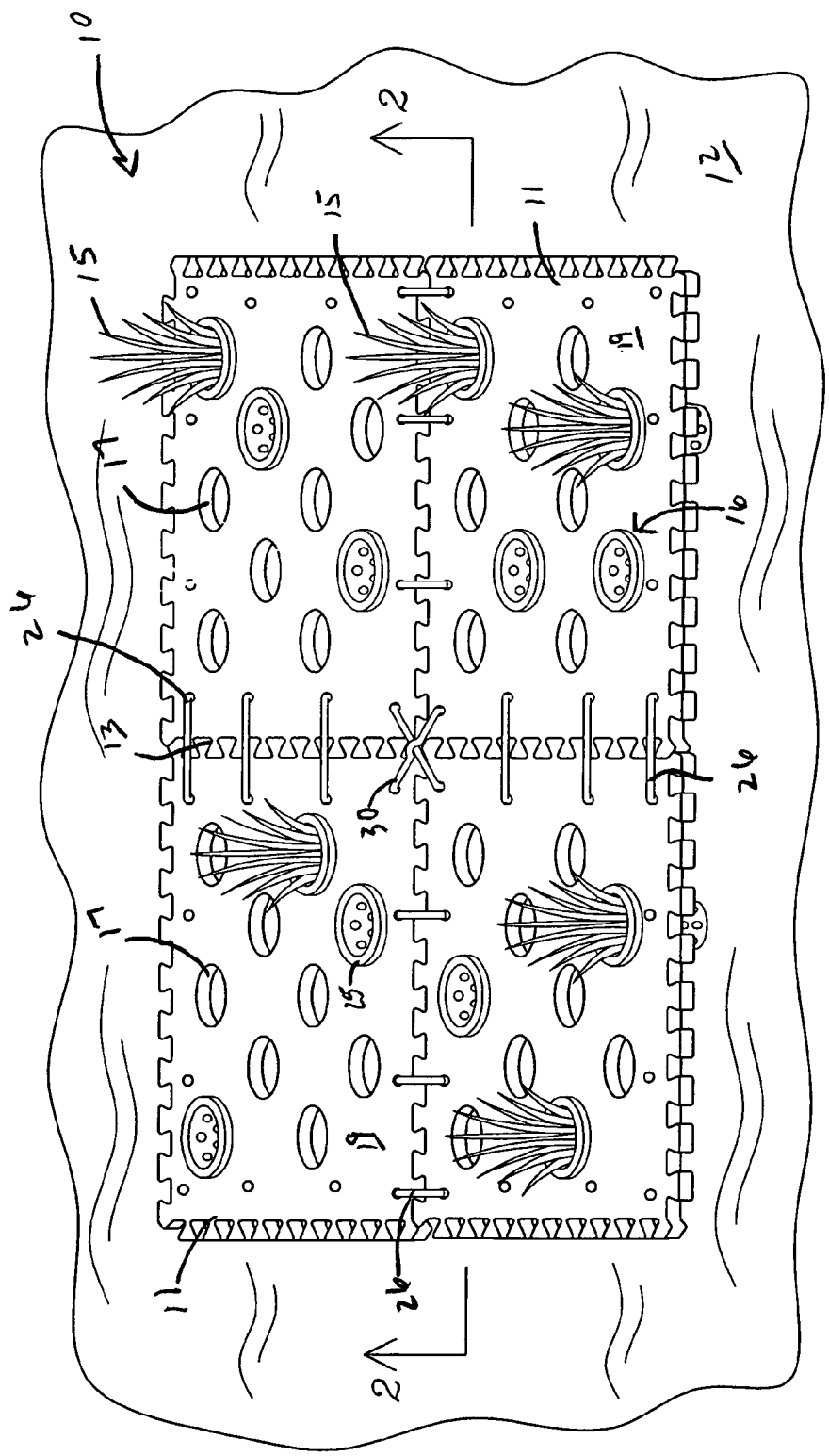
FIG. 1 is a perspective view of the floating system supporting plants in a body of water.
Figure 2:
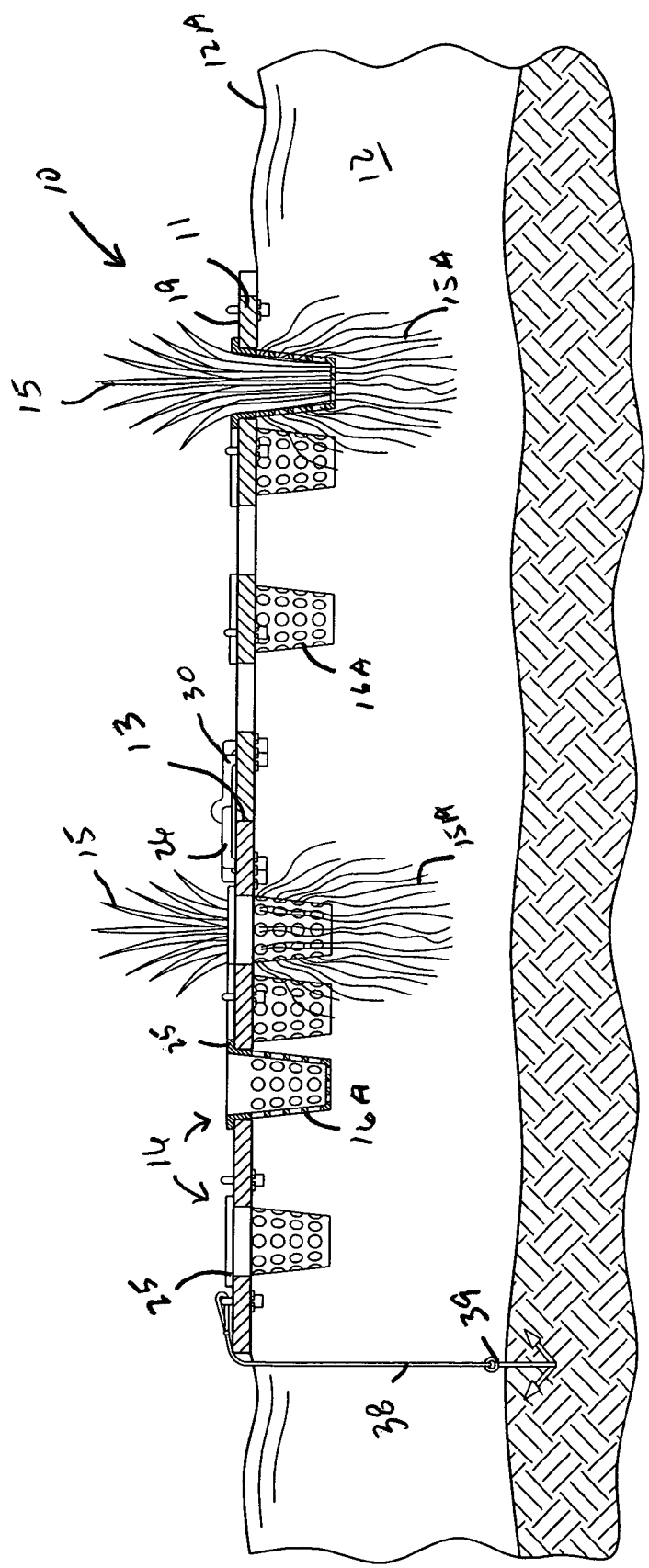
FIG. 2 is a sectional view of a single mat of the floating system in a body of water.

The present invention for a floating plant cultivation system 10 is shown in FIGS. 1 and 2 floating on a body of water 12 having a surface 12A and a shoreline (not shown). The system 10 includes a plurality of buoyant bases 11 that are attached together and float on the water 12. A tether 38 and anchor 39 shown on the bottom 14 of the body of water 12, in FIG. 2, secure the system at a desired location in the water 12. The system 10 can be positioned any where in the water including along the shoreline or towards the middle of the body of water 12.

Pots 16 are supported on the bases 11 and hold plants 15. The bases 11 have one or more holes 17 through which the pot 16 extends and holds a plant 15. As shown in FIG. 2, lower portion 16A of the pot 16 is submerged below the water surface 12A. The pot 16 is preferably aerated in the sense that the pot 16 has a plurality of apertures in the lower portion 16A so that roots 15A of the plants 15 have room to grow outside the pot 16 and below the surface of the water 12. Moreover, such aerated pots 16 allow the flow of water and nutrients in the water across the roots 15A.

The pots 16 have a ring 25 integrally attached to a top end of the lower portion 16A. The ring 25 has a diameter that is larger than a diameter of the hole 40, and rests on a top surface 19 of the base 11 supporting the pot 16 and plant 15 on the base 11. The pots 16 are preferably constructed from a durable lightweight plastic, and can be purchased from Nursery Supply Company through a nursery supplier ProSourceOne in Plymouth, Fla.

Figure 3:
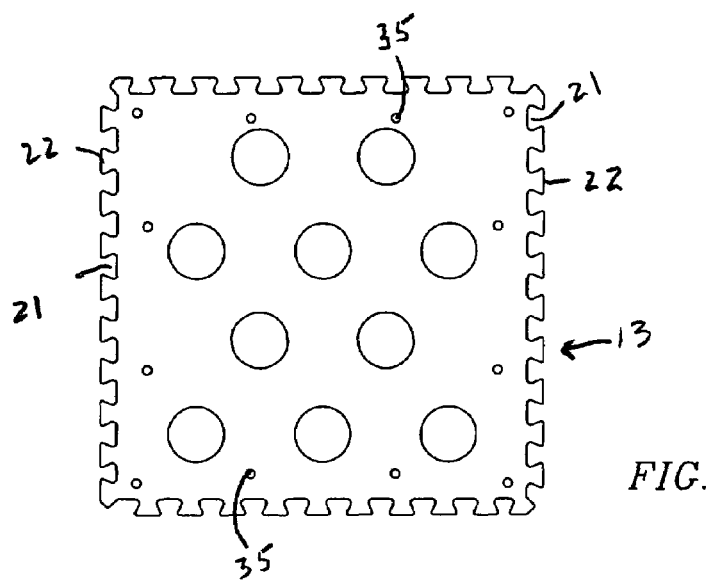
FIG. 3 is a top view of a single mat in a first embodiment of the floatable system.

The base 11 may include any configuration that has one or more side edges at least a portion of which is substantially straight. In a preferred embodiment, the base 11 is a mat fabricated from a closed-cell foam material and has a rectangular shape. The side edges 13 of the base 11 are adapted so that side edges 13 of adjacent bases 11 are connected in mating relationship with one another as shown in FIG. 1. As illustrated in FIG. 3, indentations 21 are formed in the side edges 13 of the base 11 and are spaced apart along the side edges 13 forming protrusions 22, such that an indentation 21 is positioned between consecutive protrusions 22. As shown in FIG. 1, adjacent bases 11 have protrusions 22 along their respective side edges 13 that are aligned with, and positioned in mating relationship with indentations 21 on respective side edges 13 of adjacent bases 11. In this manner, a plurality of bases 11 may be connected together to increase the size of the floating system 10.

Figure 6:
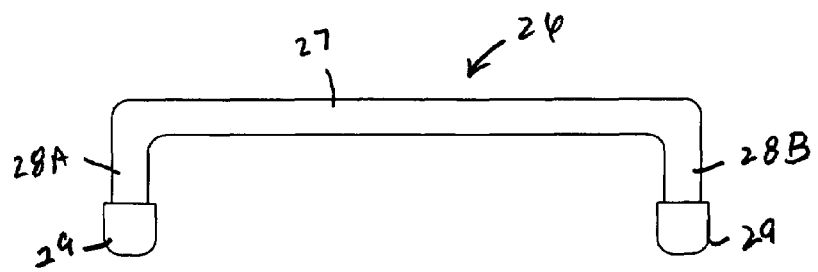
FIG. 6 is a side elevational view of a first clip of the floatable system.
Figure 8:
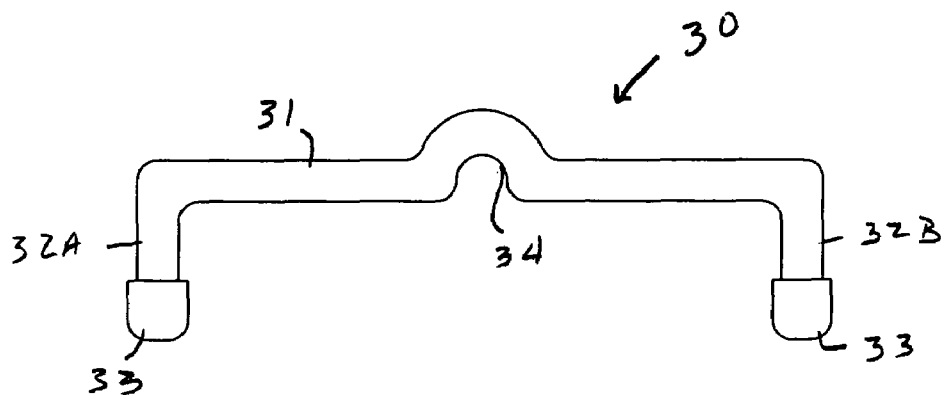
FIG. 8 is a side elevational view of a second clip of the floatable system.

The bases 11 may be further secured together by one more first clips 26 illustrated in FIG. 6, and/or by one or more second clips 30 illustrated in FIG. 8. As shown in FIG. 6, the first clip 26 includes a crossbar 27, and two legs 28A (first leg) and 28B (second leg) spaced apart and depending from the crossbar 27. A knob 29 is positioned on an end of each leg 28A and 28B distal the crossbar 27. The clips 26 are preferably fabricated from a plastic material and components of clips are integrally connected as a single unit.

Figure 7:
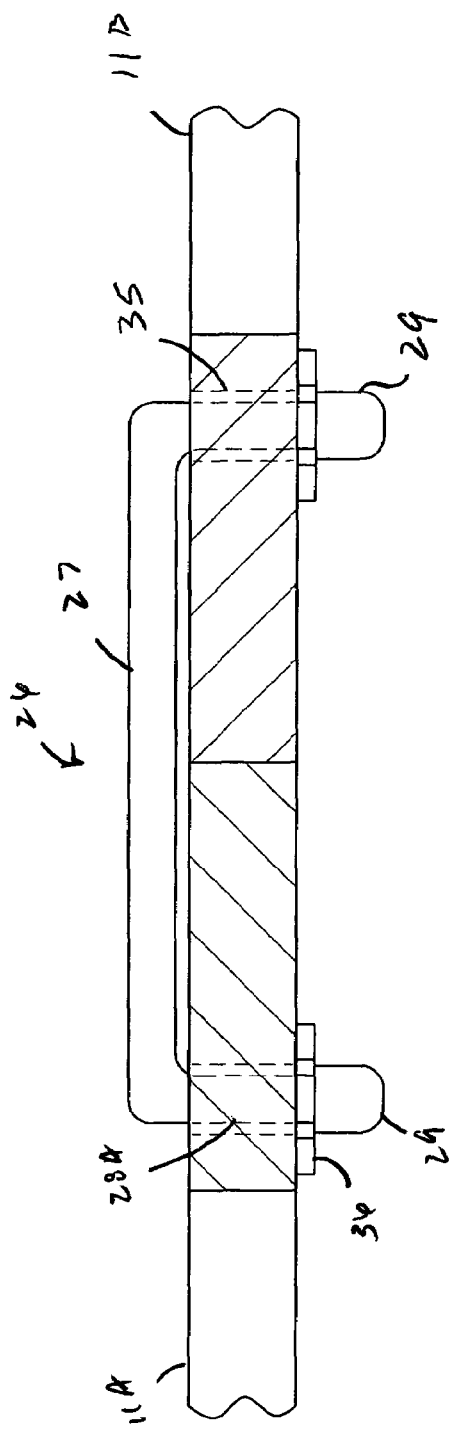
FIG. 7 is a sectional view of two mats secured together by the one or more of the first clips.

As shown in FIGS. 1 and 3, a plurality of apertures 35 are formed in the base 11 and spaced inwardly of the side edges 13 for receiving the legs 28 and knobs 29 of the clips 26. With respect to FIG. 7, and for purposes of showing how the clips 26 secure the bases together, a first base 11A is shown connected to a second base 11B. The first leg 28A, and knob 29 thereon, of the clip 26 is inserted and extends through an aperture 35 on the first base 11A. The crossbar 27 extends from the first leg 28A to the second leg 28B, across a junction between the bases 11A and 11B. The second leg 28B, and knob 29 thereon, are inserted and extend through an aperture 35 on the second base 11B.

The knobs 29 on respective legs 28A and 29B preferably have an outside diameter larger than a diameter of the aperture to secure the clips 26 to the bases 11A and 11B, and thereby secure the bases 11A and 11B together. In as much as the bases are preferable constructed of a close-cell foam material, the surfaces of the bases 11A and 11B are pliable, so the knob 29 can be forced through the aperture 35 despite the differences in diameter.

Figure 10:
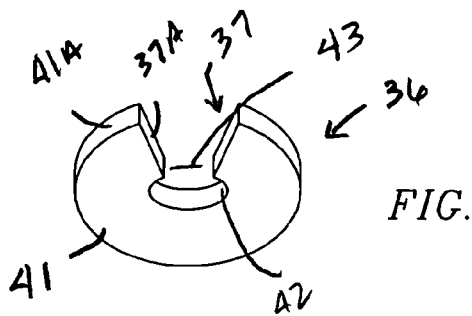
FIG. 10 is a perspective view of a washer used with the present invention.
Figure 11:
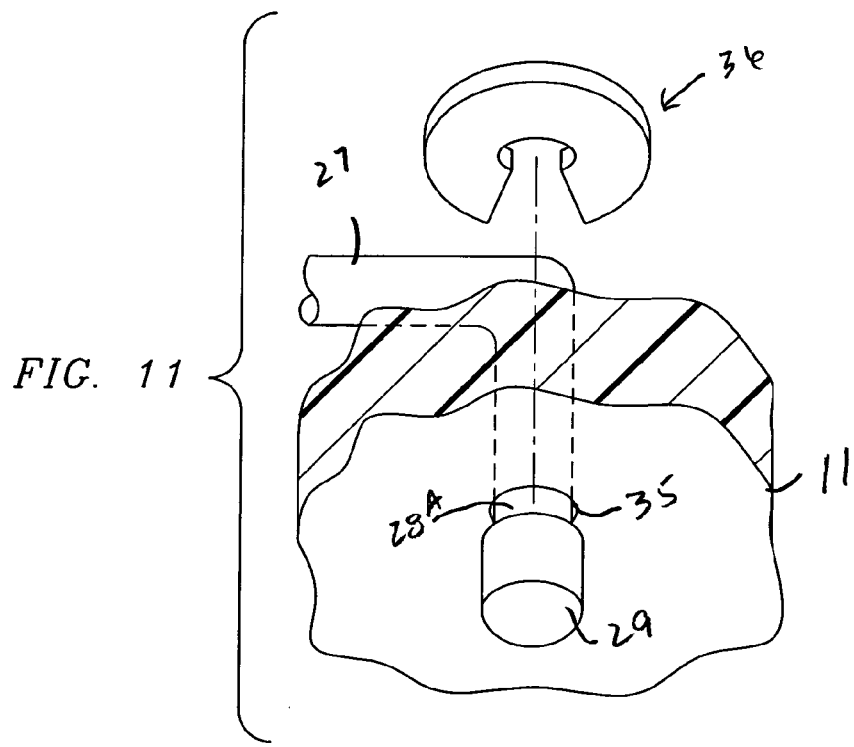
FIG. 11 is a bottom perspective view of a washer positioned to be attached to the clip.
Figure 12:
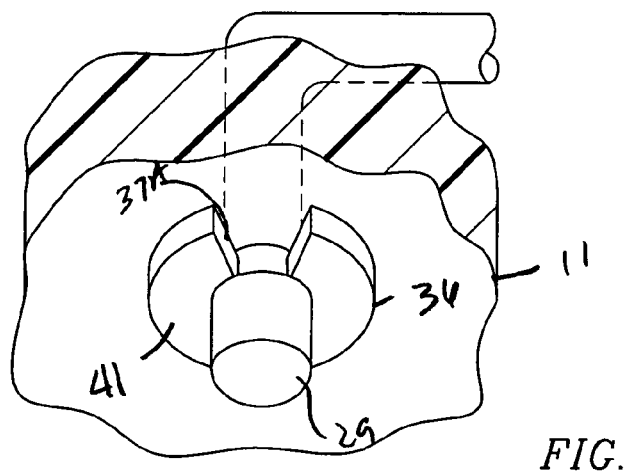
FIG. 12 is a bottom perspective view of a washer positioned on a clip used in the present invention.

As shown in FIG. 7, and 10 through 12, a washer 36 may be positioned between the knob 29 and a bottom surface 20 of the base 11A and 11B. A preferred configuration of the washer 36 is shown in FIG. 10. The washer 36 includes a flange portion 41 having an outside edge 41A. A hole 42 is centrally aligned in flange 41 for receiving the leg 28A or 28B of the clip 26. A slot 37 extends from the outside edge 41A of the flange 41 to the hole 42 so the washer 36 may engage the leg 28A and 28B between the base 11 and knob 29. As shown in FIG. 10, the slot 37 has converging edges 37A so the width of the slot narrows as it approaches the hole 42, forming an entrance 43 at the hole 42 that has a width that is slightly less than an outside diameter of the leg 28A or 28B. In this manner, the washer 36 can be secured on the leg 28A or 28B of the clip 26.

Figure 9:
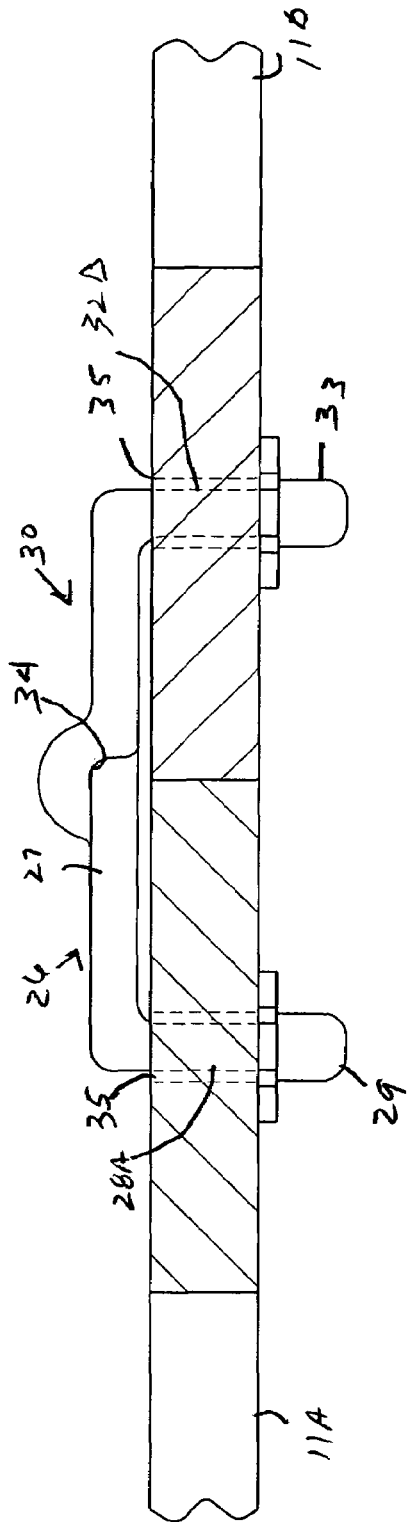
FIG. 9 is a sectional view of two mats secured together by the first and second clips.

The second clips 30 are illustrated in FIGS. 8 and 9 and in some respects are similar in configuration to the first clips 28. The second clips 30 preferably comprise a crossbar 31 having a leg 32A and 32B depending from each end of the crossbar 31. A knob 33 is disposed on the end of each of the legs 32A and 32B of the clip 30. The second clip 30 has similar dimensions to the first clip 26 with respect to the diameter of the legs 32A and 32B, crossbar 31 and knobs 33.

Figure 5:
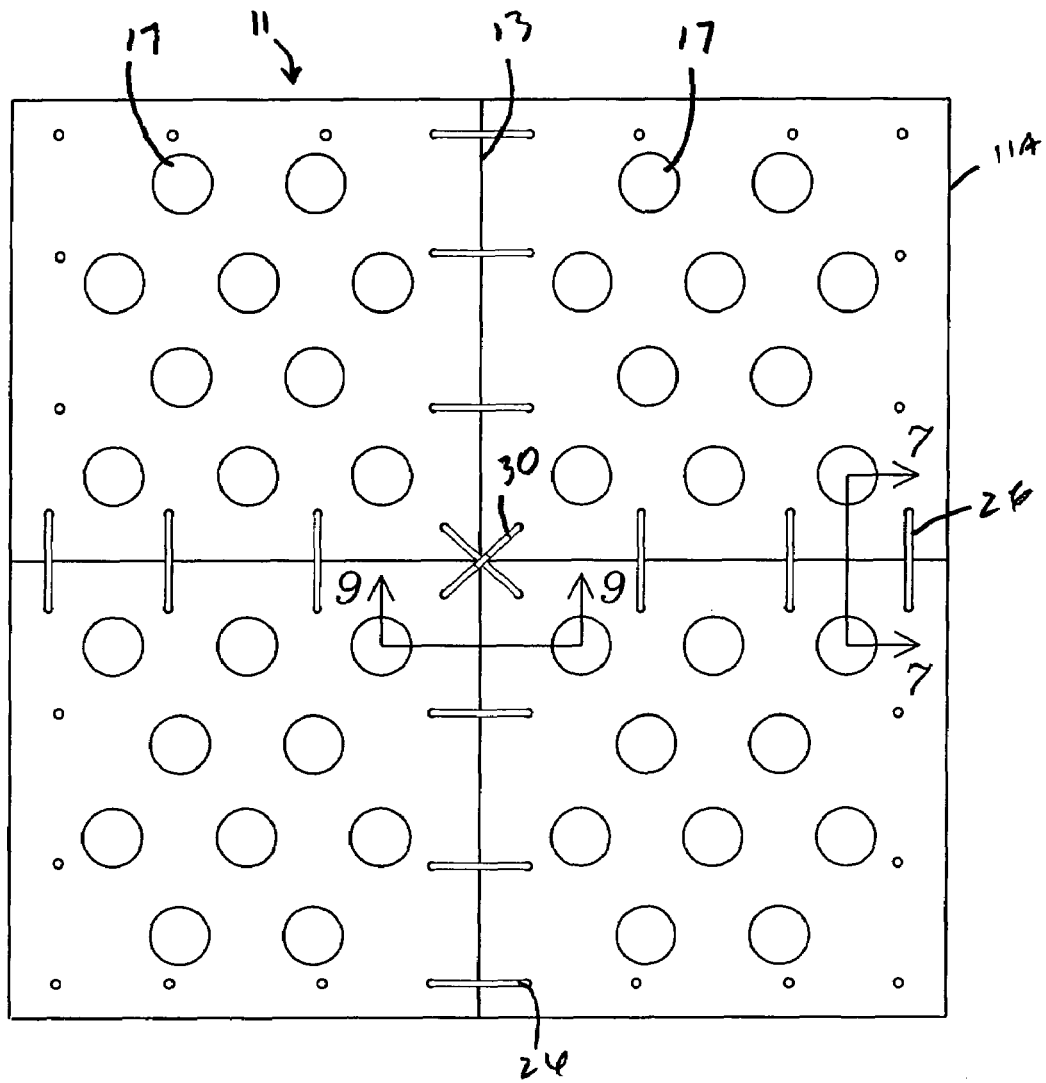
FIG. 5 is a top view of a plurality of mats in the second embodiment of the floatable system.

In addition to the above-described elements, the clip 30 includes a notch 34 positioned centrally on the crossbar 31. As shown in FIGS. 5 and 9, the apertures 35 may be positioned on the bases 11 such that the second clip 30 crosses over the first clip 26, and the notch 34 provides room for clearance of the second clip 30 over the first clip. As illustrated in FIG. 5, first clip 26 and second clip 30 are positioned diagonally at the junction of the four bases 11; however, the clips 26 and 30 may be positioned any place on the bases 11 that enables the clips 26 and 30 to join and secure together adjacent bases 11.

Figure 4:
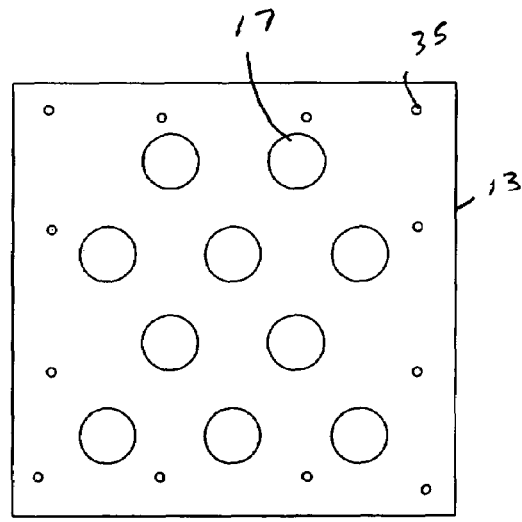
FIG. 4 is a top view of a single mat in a second embodiment of the floatable system.

The size of the clips 26 and 30 may vary, and depend on the size and/or shape of the bases 11. For example, bases 11 that are a two feet by two feet square, and one half inch thick of closed-cell foam material, clips 26 and 30 may be about four inches long measured from the center of the legs (28A, 28B, 32A and 32B) on the clips 26 and 30. A base 11 this size can hold up to about ten pots 16, or about 2½ pots per square foot. The indentations 21 along the edges 18 of the base 11 are from about a half an inch to about one inch deep. The protrusions 22 preferably have a wedge-shape configuration as shown in FIG. 1 and 4, having a width that is about 3½ inches at is widest point along the outside edge 13 of the base 11, and narrowing to about one inch. The indentations 22 have similar dimensions, so that indentations 21 and protrusions 22 mate with another when two bases 11 are adjoined. The bases may be purchased from Pak-Lite, Inc. located in Atlanta, Ga.

While the preferred embodiments of the present invention have been shown and described herein, it will be obvious that such embodiments are provided by way of example only and not of limitation. Numerous variations, changes and substitutions will occur to those skilled in the art without departing from the teaching of the present invention. Accordingly, it is intended that the invention be interpreted within the full spirit and scope of the appended claims.

We claim:

1. A floatable plant cultivation system, comprising:
   a first buoyant base having at least one side edge;
   a second buoyant base having at least one side edge positioned adjacent to the side edge of the first base;
   means, on the first base and second base, for supporting a plurality of plants;
   a plurality of indentations spaced apart along the side edge of each of the first base and along the side edge of the second base forming a plurality of protrusions and each indentation is positioned between consecutive protrusions and the protrusions on the first base are positioned in mating relationship with the indentations on the second base, and the protrusions on the second base are positioned in mating relationship with the indentations on the first base, said mating relationship of the protrusions of the first base with the indentations of the second base and said mating relationship of the protrusions of the second base with the indentations of said first base are configured to prevent separation of said first base from said second base; and at least one first clip having a first leg extending through an aperture in the first base and having a knob on a first end thereof and the knob having a diameter larger than a diameter of the aperture, the first clip also having a crossbar integrally attached to a second end of the first leg and the crossbar extends to a second leg that extends through an aperture formed in the second base, and the second leg having a knob on a first end thereof, and the knob having a diameter larger than a diameter of the aperture.

2. The system of claim 1 wherein the first base and the second base are fabricated from a closed-cell foam material.

3. The system of claim 1 wherein the means for supporting the plurality of plants on the base comprises a plurality of holes formed in the base, and a plurality of pots supported on the base and extending through the plurality of holes.

4. The system of claim 1 further comprising at least one clip having a first leg secured to the first base, a second leg secured to the second base and a cross bar integrally attached to the first leg and the second leg, and extending there between.

5. The system of claim 1 further comprising a first washer positioned between the knob on the first leg of the clip and the first base, and a second washer positioned between the knob on the second leg of the clip and the second base.

6. The system of claim further comprising a second clip having a first leg secured to the first base, a second leg secured to the second base and a cross bar integrally attached to the first leg and the second leg, and extending there between and over the first clip, and the second clip having a notch formed in the crossbar for receiving the crossbar of the first clip.

7. The system of claim 1 further comprising a tether having a first end secured to the first base or second base and a second end having an anchor secured thereto.

8. A floatable plant cultivation system, comprising:
   a first buoyant base having at least one side edge;
   a second buoyant base having at least one side edge abutting the side edge of the first base;
   means, on the first base and second base, for supporting a plurality of plants on the base;
   at least one first clip having a first leg extending through an aperture in the first base and having a knob on a first end thereof and the knob having a diameter larger than a diameter of the aperture, the first clip also having a crossbar integrally attached to a second end of the first leg and the crossbar extends to a second leg that extends through an aperture formed in the second base, and the second leg having a knob on a first end thereof, and the knob having a diameter larger than a diameter of the aperture; and a plurality of indentations spaced apart along the side edge of each of the first base and along the side edge of the second base forming a plurality of protrusions and each indentation is positioned between consecutive protrusions and the protrusions and each indentation is positioned in mailing relationship with the indentations on the second base, and the protrusions on the second base are positioned in mating relationship with the indentations on the first base, said mating relationship of the protrusions of the first base with the indentations of the second base and said mating relationship of the protrusions of the second base with the indentations of said first base are configured to prevent separation of said first base from said second base.

9. The system of claim 8 wherein the means for supporting the plurality of plants on the base comprises a plurality of holes formed in the base, and a plurality of pots supported on the base and extending through the plurality of holes.

10. The system of claim 8 wherein the first base and the second base are fabricated from a closed-cell foam material.

11. The system of claim 8 wherein the means for supporting the plurality of plants on the base comprises a plurality of holes formed in the base, and a plurality of pots supported on the mat and extending through the plurality of holes.

12. The system of claim 8 further comprising a first washer positioned between the knob on the first leg of the clip and the first base, and a second washer positioned between the knob on the second leg of the clip and the second base.

13. The system of claim 8 further comprising a second clip having a first leg secured to the first base, a second leg secured to the second base and a cross bar integrally attached to the first leg and the second leg, and extending there between and over the first clip, and the second clip having a notch formed in the crossbar for receiving the crossbar of the first clip.

14. The system of claim 8 further comprising a tether having a first end secured to the first base or second base and a second end having an anchor secured thereto.

* * * * *